(No Model.)
J. G. LEYNER.
PNEUMATIC WATER ELEVATOR.
No. 585,683. Patented July 6, 1897.
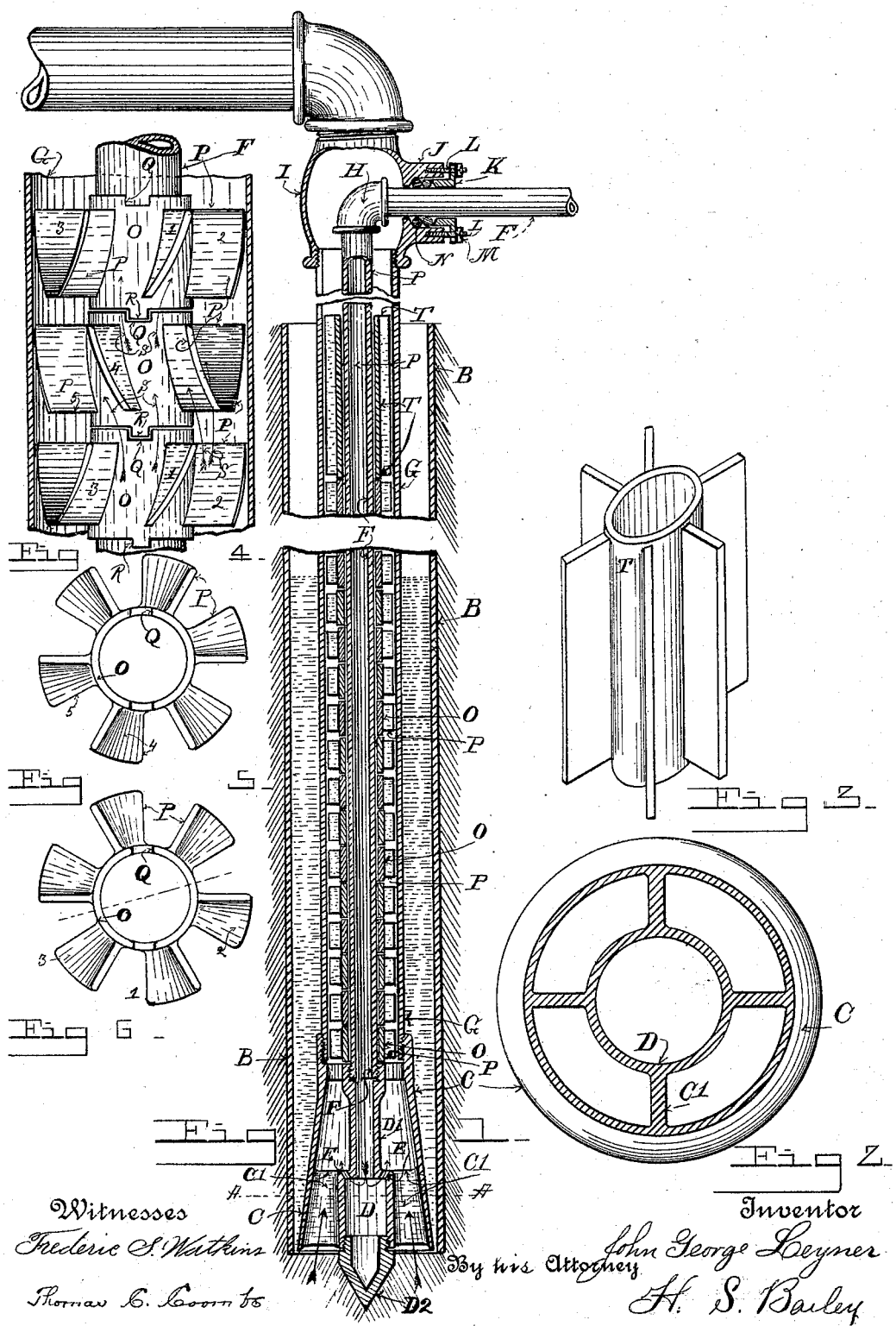
Witnesses
Frederic S. Watkins
Thomas E. Coombs
Inventor
John George Leyner
By his Attorney H. S. Bailey

UNITED STATES PATENT OFFICE.

JOHN GEORGE LEYNER, OF DENVER, COLORADO.

PNEUMATIC WATER-ELEVATOR.

SPECIFICATION forming part of Letters Patent No. 585,683, dated July 6, 1897.

Application filed August 4, 1896. Serial No. 601,623. (No model.)

*To all whom it may concern:*

Be it known that I, JOHN GEORGE LEYNER, a citizen of the United States of America, residing at Denver, in the county of Arapahoe and State of Colorado, have invented certain new and useful Improvements in Pneumatic Water-Elevators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in pneumatic water-elevators. This principle of elevating water is especially adapted for use in mines, Artesian wells, and wherever it is convenient to convey through pipes a constantly-accumulating body of water to a desired point. In the present state of the art it is the practice to introduce an intermittent or steady flow of air under pressure below the level of the body of water to be elevated and at or near its bottom and also to introduce independent supplies of air into the conveying-pipe at various points intermediate of the body of water and the discharge end of the conveying-pipe to assist the air first introduced to lift and displace the water above. In the several devices in use and by this principle for elevating water the air is allowed to travel through the conveying-pipe in the independent separated bodies of air in which it is fed or which it assumes when fed continuously into the pipe. These separated bodies of air form short piston-like sections in the pipe, which do not mingle with the water, but maintain their volume intact and position relative to that part of the water they engage when introduced into it. Another disadvantage of these systems is the continuous intermittent pounding or cracking in the conveying-pipe, due to the compression of the air by the body of water above and the push of the water below it, from which it cannot escape except by raising the water above it, as a piston or slug of air which fills the pipe will not rise through the water.

The objects of my invention are, first, to provide means for dividing and subdividing and disseminating successively from its point of introduction into the conveying-pipe for a portion of its length the volume of air and thereby to thoroughly commingle the water and air together; second, to provide means for conducting both the air and water to a series of independent zigzag passages alternating from right to left and from left to right on its way through the conveying-pipe and so arranged as to continuously divide and subdivide both air and water and cause them both to be thoroughly disseminated and commingled, whereby the air is separated into innumerable small bubbles, which rise rapidly through the water and aerate it and cause it to flow in an even and continuous stream through the conveying-pipe, and, third, to provide a positive automatic air subdivider and disseminator and a combined air and water commingling device for the ingress end of the conveying-pipe. I attain these objects by the mechanism illustrated and described in the accompanying drawings and specifications, in which—

Figure 1 represents a vertical section through an Artesian well with casing and my improved water-elevating mechanism; Fig. 2, a plan view in section of the bell-shaped water-receiving nozzle at the lower end of the well on line A A of Fig. 1; Fig. 3, a perspective view of the section of a member I employ for guiding the water and air into a straight course after it has become thoroughly intermingled; Fig. 4, a fragment in elevation of the conveyer-pipe and the automatic air-subdivider and air and water commingler; Fig. 5, a plan view of one of the fluted collars of the air-disseminator and water and air mixer, and Fig. 6 a plan view of a similar fluted collar with the flutes and partition-blades pitching in an opposite direction from those in the collar in Fig. 5.

Similar letters of reference refer to similar parts throughout the several views.

I prefer to illustrate my improvement adapted to an Artesian well, although the arrangement of the parts would be similar wherever water is to be raised.

Referring to Fig. 1, B designates a casing which is placed in the drilled well and extends to its bottom. In the bottom of the casing I place a bell-shaped nozzle C. This nozzle comprises a circular casting, which at its lower end fills loosely the casing. The lower portion of the nozzle is provided with webs C', which extend from the exterior shell to a tubular portion D at its center. The lower end of this tube portion is provided with a cap D², which is made detachable in order that the air-egress holes E through the upper part of the tubular portion may be conveniently drilled. The cap is pointed to allow as much water-space as possible at the mouth of the nozzle. The tube portion D is extended upward in a reduced tubular portion D' to near the top of the bell-casting, where it is threaded to a pipe F. The outside upper end of the bell or nozzle is threaded to a conveying-pipe G. This conveying-pipe extends up through and above the casing and is turned by an elbow H to one side and is extended to the desired point of delivery. The pipe F, which connects with the central tubular portion of the bell, is arranged centrally in the conveying-pipe G and also extends above the casing and is turned by an elbow and emerges from the conveyer-pipe through a special form of fitting I, which is provided with a stuffing-box J, in which is fitted a gland K. This gland is adjustably secured to the stuffing-box by means of stud-screws L and nuts M. Through the gland a hole is bored, and also through the end wall of the stuffing-box, through which the pipe passes. Suitable packing N is introduced in the stuffing-box to pack the outlet against leakage. This pipe is extended and connected to an air-compressor or to its receiving storage-tank, if preferred, although it is not necessary to use a receiver intermediate of the compressor and the well. The ribs C' in the bottom of the nozzle, which support the central tubular portion of the bell, extend upward only as far as the top of the largest diameter of the tube. Above them a clear circular space surrounds the smaller tube. The difference in diameter of the two tubular portions forms a shoulder at their junction. Through this shoulder I drill a number of holes E, through which the air escapes from the pipe F and the tubes into the body of the nozzle. I place loosely on the air-pipe F from the top of the air-receiving tube of the nozzle and upward from a portion of the pipe's length a series of fluted collars O, arranging them one upon another. These collars are provided with blades P, which radiate from the hub or collar portion in a concentric circle to the inner periphery of the conveyer-pipe, in which they fit freely. These blades form radial partitions which divide the pipe's area into independent passages. Each collar is independent of the others. The blades are arranged obliquely to each collar's axis and all the blades of each collar are arranged in the same direction. The blades may be either straight or curved. The collars are made rights and lefts. The rights have their blades pitching obliquely to the collar's axis in one direction, or to the right, as in Fig. 6, and the lefts their blades pitching in the opposite direction, or to the left, as in Fig. 5.

The hub of each collar is provided on one end with a notch Q and on the opposite end with a projection-lug R, adapted to fit into a similar notch of oppositely-pitched blades. These collars are arranged one upon the other with the rights and lefts in alternate order, and the notches and projections are positioned on the hubs to engage one another at points that will bring the blades of each alternate collar centrally in the spaces between the adjacent blades of the collars both below and above it. This arrangement causes the water and air flowing through the flutes between any two blades to flow against the intermediate blade of the collar above and divide one part of the air and water flowing up on one side and the other part on the opposite side of it, as shown by the arrows S in Fig. 4. The notches also lock the collars one to another in this position against rotary displacement. I preferably make the hub portions of the collars a trifle longer at each end than the length of the blades in order to break the course of the flutes between the collars, which are the spaces or passages between the blades. The hub portions are also lengthened to make a circumferential space between the blades of each collar for the air to move laterally or circulate in. These collars thus arranged and combined together into a string of suitable length on the air-pipe form a complete circle of separated interdigitally-arranged intersecting zigzag partitions and flutes inside of the conveying-pipe and make a practical automatic air and water commingling device. The compressed air flows down through the pipe F into the tube portions of the nozzle, from which it flows through the holes E into the upper portion of the nozzle and into the conveying-pipe. The water flows from the surrounding ground into the nozzle and casing. The compressed air moves with considerable velocity and carries the water along with it, and both air and water are violently agitated as they pass through these zigzag flutes, and the air is rapidly subdivided and thoroughly disseminated and commingled with the water in the shape of innumerable small bubbles, which being small and light shoot to the top of the water in a continuous stream and lift, draw, and buoy it up and discharge it from the well. At the end of the collars I place on the pipe F a long sleeve T, which I illustrate in Fig. 3. This sleeve is provided with several straight partitioned blades extending to the inner periphery of the conveying-pipe, forming straight passages from the collars, adapted to guide the air-bubbles into a straight upward movement in the conveying-pipe. While I have illustrated my air and water commingling device built up in sections, it is obvious that it can be cast or made in an integral single member of suitable length. The commingling of the air and water prevents the pounding in the well, as the air, instead of doing its work in solid piston-like portions, is disseminated into innumerable small bubbles, each of which has plenty of room in which to rise through the water, and in Artesian wells of drinking-water when pure air is used the water thus aerated is improved in quality.

Having described my invention, what I claim as new, and desire to secure by Letters Patent, is—

1. In a pneumatic water-elevator the combination with the air-conveying pipe, the water-inlet nozzle and the air-delivery pipe, of an automatic air and water subdividing and commingling device comprising a plurality of independent collars surrounding said air-delivery pipe above and adjacent to the ingress of the air, and having a row of separated partitions radiating therefrom and extending to the inner walls of the water-delivery pipe and inclined to the axis of the delivery-pipe, and the partitions of each alternating collar arranged to intersect the spaces between the partitions of the collar above and below it whereby a plurality of tortuous, zigzag, intersecting passages and partitions are formed in the delivery-pipe through which the water and air must pass, substantially as described.

2. In a pneumatic water-elevator the combination with the conveying-pipe, of a plurality of independent partitions radiating in a circle across the pipe's area at a number of separated but adjacent points in a portion of said pipe's length and within said pipe adjacent to and above its water and air ingress end and having the partitions in each circle arranged above the spaces between the partitions in the circle below them and below the spaces between the partitions in the circle above them, substantially as described.

3. The combination in a pneumatic water-elevator, of the conveyer-pipe, the water-inlet nozzle having the tubular central portion provided with air-egress passages, the air-supply pipe and a plurality of collars arranged one above the other on said air-pipe adjacent to said nozzle, having on each collar a plurality of separated radiating blades extending to the inner periphery of the conveyer-pipe and forming radial partitions between the two and having the blades of each collar inclined to the axis of the air-pipe and arranged above the spaces between the partitions in the collar below them and below the spaces between the partitions of the collar above them, and the blades of each alternate collar inclined in opposite directions, and means for securing the collars one upon the other against rotary displacement and in positions to bring the blades of each collar to intersect in interdigitational order, the spaces between the blades of its adjacent collar, substantially as described.

4. The combination of the conveyer-pipe, the nozzle and the air-pipe, of a plurality of collars arranged in axial alinement on said air-pipe adjacent to said nozzle having each a plurality of radiating blades oblique to the axis of the air-pipe extending to the walls of the conveyer-pipe, and having the blades of alternate collars inclined in an opposite direction, means for locking the collars against rotative movement in positions to bring the blades of one collar to intersect in interdigitational order, the spaces between the blades of its adjacent collar, and a sleeve fitting over said air-pipe in juxtaposition to said collars having a plurality of straight partition-blades radiating to the inner periphery of said conveying-pipe, substantially as described.

5. The combination of a water-conveying pipe, a compressed-air-delivery pipe within said conveying-pipe, a water-inlet nozzle connected to both air and water pipes, means for delivering compressed air in said conveying-pipe from said air-pipe at or adjacent to said nozzle, means substantially as described comprising the independent collars and their interdigitationally-arranged partitions adapted to subdivide and commingle the air and water together and the pipe-fitting interposed in the conveying-pipe at the point of entrance of said air-pipe and having a packing-chamber and gland encircling the air-pipe and adapted to pack the entrance-aperture thereof against leakage, substantially as described.

In testimony whereof I affix my signature in presence of two witnesses.

JOHN GEORGE LEYNER.

Witnesses:
 FREDERIC S. WATKINS,
 THOMAS C. COOMBS.